United States Patent
Peled et al.

(10) Patent No.: US 6,216,206 B1
(45) Date of Patent: *Apr. 10, 2001

(54) TRACE VICTIM CACHE

(75) Inventors: Guy Peled, Yokneam; Ilan Spillinger, Haifa, both of (IL)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/991,173

(22) Filed: Dec. 16, 1997

(51) Int. Cl.[7] .................................................. G06F 12/00
(52) U.S. Cl. .............................. 711/133; 711/3; 712/230
(58) Field of Search .................................... 711/118, 133, 711/122, 3; 395/391; 712/230

(56) References Cited

U.S. PATENT DOCUMENTS

| | | | |
|---|---|---|---|
| 5,381,533 | * 1/1995 | Peleg et al. | 395/391 |
| 5,526,510 | * 6/1996 | Akkary et al. | 711/133 |
| 5,577,227 | * 11/1996 | Finnell et al. | 711/122 |
| 5,649,154 | * 7/1997 | Kumar et al. | 711/122 |
| 5,822,755 | * 10/1998 | Shippy | 711/118 |
| 6,018,786 | * 1/2000 | Krick et al. | 711/4 |

* cited by examiner

Primary Examiner—Do Yoo
Assistant Examiner—Nasser Moazzami
(74) Attorney, Agent, or Firm—Blakely, Sokoloff, Taylor & Zafman LLP

(57) ABSTRACT

A cache memory includes a data array and a trace victim cache. The data array is adapted to store a plurality of trace segments. Each trace segment includes at least one trace segment member. The trace victim cache is adapted to store plurality of entries. Each entry includes a replaced trace segment member selected for replacement from one of the plurality of trace segments. A method for accessing cached instructions, the cached instructions being stored in a data array, the cached instructions being organized in trace segments, the trace segment having a plurality of trace segment members, includes retrieving a first trace segment member of a first trace segment; identifying an expected location within the data array of at least one subsequent trace segment member of the first trace segment; determining if the subsequent trace segment member is stored in the data array at the expected location; and determining if the subsequent trace segment member is stored in a trace victim cache if the subsequent trace segment member is not stored in the data array at the expected location.

28 Claims, 6 Drawing Sheets

| Valid 420 | LA 415 | Head 405 | Tail 410 | Next Way 425 | Prev. Way 430 | ... | uIP 435 | NLIP 440 | uIP Valid 445 |

FIGURE 4 400

| uOP0 510 | uOP1 510 | uOP2 510 | uOP3 510 | uOP4 510 | uOP5 510 |

FIGURE 5 500

| uOP Valid 610 | ΔIP 660 | ΔIP Valid 670 | Branch Target 680 | FOP Code 690 | SRC 0 620 | SRC 1 630 | Dest. 640 | uOP Code 650 | ... |

FIGURE 6 510

TRACE VICTIM CACHE

BACKGROUND OF THE INVENTION

1. FIELD OF THE INVENTION

The present invention relates to the field of computer systems. More specifically, the present invention relates to the art of caching decoded micro-operations with trace segments and providing a victim cache for replaced cache lines.

2. DESCRIPTION OF RELATED ART

Historically, cached instructions are stored and organized in an instruction cache in accordance with the instructions' memory addresses. Each cache line stores a number of instructions that are spatially adjacent each other in main memory. This historic approach to caching instructions has at least one disadvantage in that it typically requires multiple cache lines to be accessed when execution of a program necessitates branching from the middle of a cache line or branching into the middle of a cache line.

In a cache organized by instruction address, a full line of adjacent instructions is typically fetched from the main memory and loaded into the cache. If the cache becomes fill, an existing line in the cache memory is replaced to accommodate a new line of instructions required by the microprocessor. The replacement of a particular line does not impact any other lines in the cache.

An alternative approach to organizing cached instructions is known, whereby cached instructions are organized by instruction trace segments. Each cache line stores an instruction trace segment comprising one or more basic blocks of instructions that are predicted to be sequentially executed. For example, in an embodiment where each cache line comprises two basic blocks of instructions, the second basic block of instructions includes instructions to be executed if the branch instruction located at the end of the first basic block is taken. Assuming the branch is predicted taken, the second basic block is included in the same trace segment. A particular trace segment may extend over a number of cache lines. Each trace segment is retrieved based on the memory address of the first instruction in the trace segment.

A cache organized by trace segments is typically operated in one of two modes, an execution mode, and a build mode. Instructions are read from the cache memory during the execution mode and trace segments are built into the cache memory in the build mode. If an instruction required by the microprocessor is not present in the cache memory, a cache miss is generated and the cache memory switches to build mode. A switch to build mode results in a performance penalty due to the latency generated as new instructions must be fetched, decoded, and supplied to the microprocessor.

In a trace cache arrangement, a line replacement is more costly than in a traditional cache arrangement. For example, consider a trace segment occupying six cache lines. The fourth line of the trace segment is replaced. Because the trace segment can only be accessed through the address of the first instruction in the first cache line (i.e. the head of the trace segment), only lines one, two, and three, will be accessible after the replacement of the fourth line. Lines, five and six will be unavailable because they were cut off from the trace segment when the fourth line was replaced.

As a result, when the processor accesses the trace segment to retrieve instructions, a cache miss will occur after the third line. The processor will then switch to build mode to begin a new trace segment including the replaced fourth line and cut off fifth and sixth lines. As a result, the instructions contained in the fifth and sixth lines will be cached twice.

Thus, it is desirable to have a new approach for caching instructions that reduces the performance penalty caused by cache line replacements and reduces the degree of code redundancy present in the cache.

SUMMARY OF THE INVENTION

An aspect of the invention is seen in a cache memory including a data array and a trace victim cache. The data array is adapted to store a plurality of trace segments. Each trace segment includes at least one trace segment member. The trace victim cache is adapted to store plurality of entries. Each entry includes a replaced trace segment member selected for replacement from one of the plurality of trace segments.

Another aspect of the invention is seen in a method for accessing cached instructions. The cached instructions are stored in a data array and organized in trace segments. The trace segment has a plurality of trace segment members. The method includes retrieving a first trace segment member of a first trace segment; identifying an expected location within the data array of at least one subsequent trace segment member of the first trace segment; determining if the subsequent trace segment member is stored in the data array at the expected location; and determining if the subsequent trace segment member is stored in a trace victim cache if the subsequent trace segment member is not stored in the data array at the expected location.

BRIEF DESCRIPTION OF THE DRAWINGS

FIGS. 4, 5, and 6 illustrate the content of a cache tag entry, a data line, and a micro-op, respectively;

Figure 1:
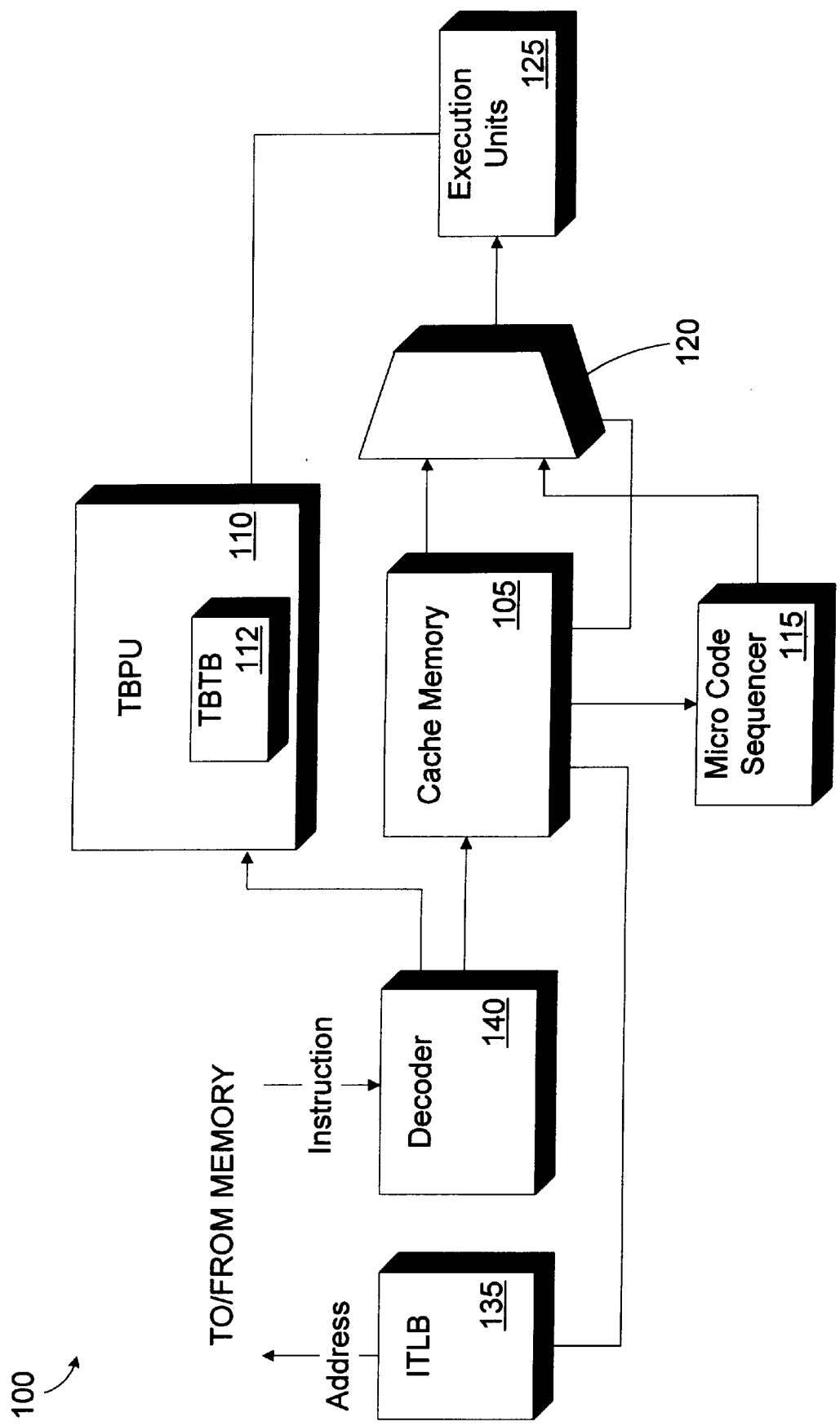
FIG. 1 is a block diagram of a processor core including a cache memory suitable for practicing the invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

The following examples are included to demonstrate preferred embodiments of the invention. It should be appreciated by those skilled in the art that the techniques disclosed in the examples that follow represent techniques discovered by the inventor to function well in the practice of the invention. However, those skilled in the art should, in light of the present disclosure, appreciate that many changes can be made in the specific embodiments disclosed herein without departing from the spirit and scope of the invention.

Referring first to FIG. 1, one embodiment of a computer system 100 suitable for practicing the present invention is illustrated. As shown, the computer system 100 includes a cache memory 105. The computer system 100 includes a trace branch prediction unit (TBPU) 110 (which includes branch target address calculation circuitry as well as next IP calculation circuitry), microcode sequencer 115, multiplexer 120, execution units 125, instruction translation look-aside buffer (ITLB) 135, and decoder 140.

The structure and operation of the cache memory 105 is described in greater detail below in reference to FIG. 2. The other elements 110–140 are intended to represent a broad category of these types of elements found in the art. In one embodiment, the elements are disposed in the same processor integrated circuit (chip).

Figure 2:
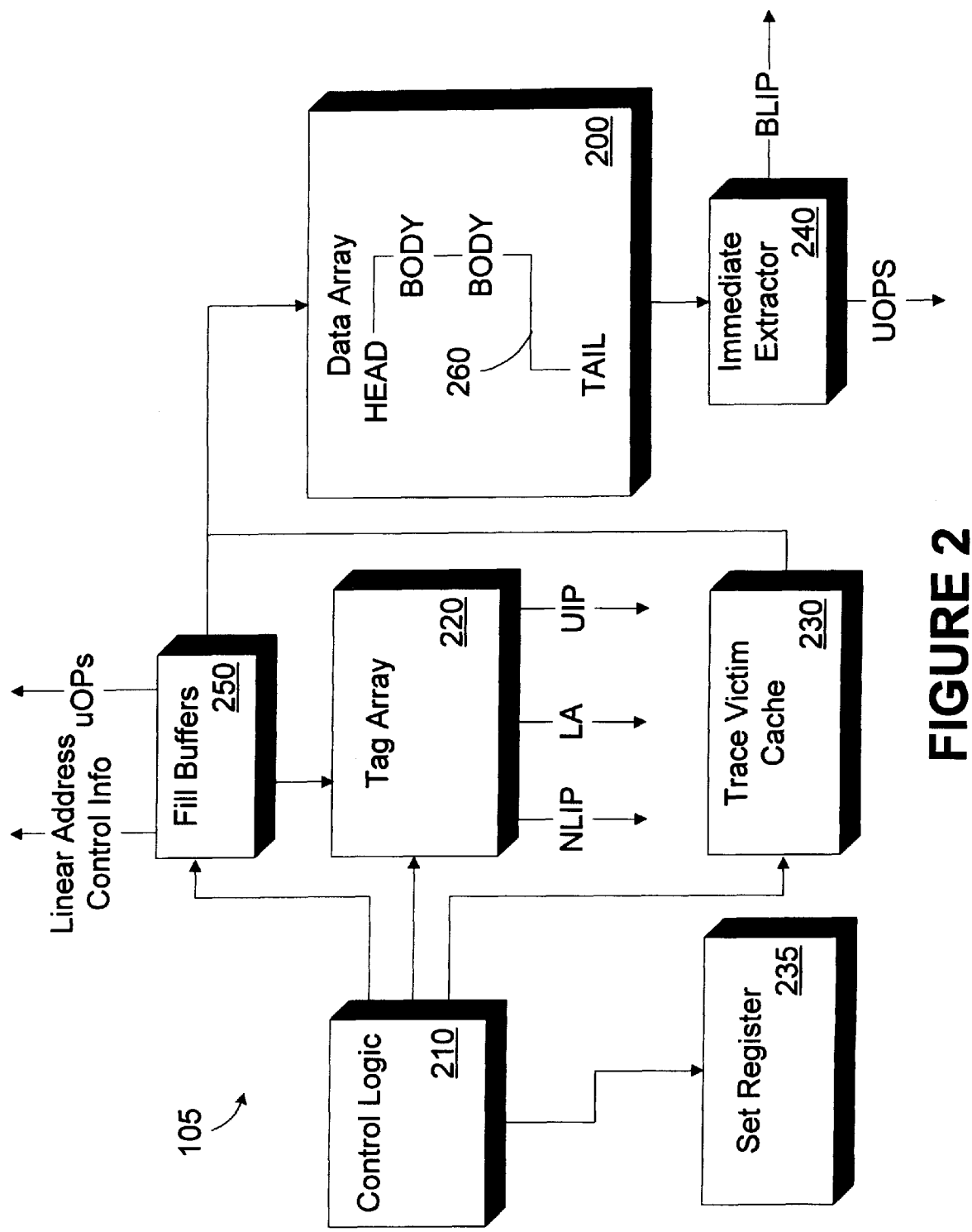
FIG. 2 is a block diagram illustrating one embodiment of the cache memory of FIG. 1.

Referring now to FIG. 2, a block diagram illustrating one embodiment of the cache memory 105 of the present invention is shown. As illustrated, the cache memory 105 includes a data array 200 and control logic 210, coupled to each other as shown. For the illustrated embodiment, the cache memory 105 further comprises a tag array 220, a trace victim cache (TVC) 230, a set register 235, an immediate extractor 240, and fill buffers 250, coupled to each other and to the above enumerated elements as shown.

As in conventional cache memories, the data array 200 comprises a plurality of data lines shown in FIG. 5), and the tag array 220 comprises a plurality of tag entries shown in FIG. 4) corresponding to the data lines. The combination of the data lines and tag entries form cache lines of the cache memory 105. However, unlike conventional cache memories, the control logic 210 operates the cache memory 105 to cache decoded micro-ops in the data array 200, organizing the cached micro-ops by trace segments, e.g. 260, including trace segments that span multiple data lines. Each trace segment 260 includes one or more trace segment members of one or more instructions, with each trace segment member occupying one data line, and the data lines of a multi-line trace segment being sequentially associated (logically). Retrieval of the trace segment members of a multi-line trace segment is accomplished by first locating the data line storing the first is trace segment member of the multi-line trace segment, and then successively locating the remaining data lines storing the remaining trace segment members based on the data lines' logical associations as described in more detail below. Although the specification describes caching micro-ops of macro instructions, the invention is not so limited. The invention may be applied to caching any type of instructions, with a micro-op being an illustrative example of one such instruction type.

Those skilled in the art will also appreciate that by trace caching instructions or decoded micro-ops in this manner, i.e. allowing a trace segment to span multiple data lines, the amount of instructions that can be supplied to the execution units of a processor will be larger than the rate that can be sustained by the prior art approaches. Furthermore, by virtue of allowing multi-data line trace caching, the size of the program loops that will be automatically unrolled will be larger, effectively eliminating the need for a compiler to perform loop unrolling optimization to "maximize" exploitation of processor performance. As a result, the generated code of programs will be more compact, which in turn will lead to memory space and instruction fetch time savings.

Also, although the invention is described in reference to storing trace segments, the invention may be applied to storing any data element of one or more data sub elements stored in one or more lines in a data array 200.

Figure 3:
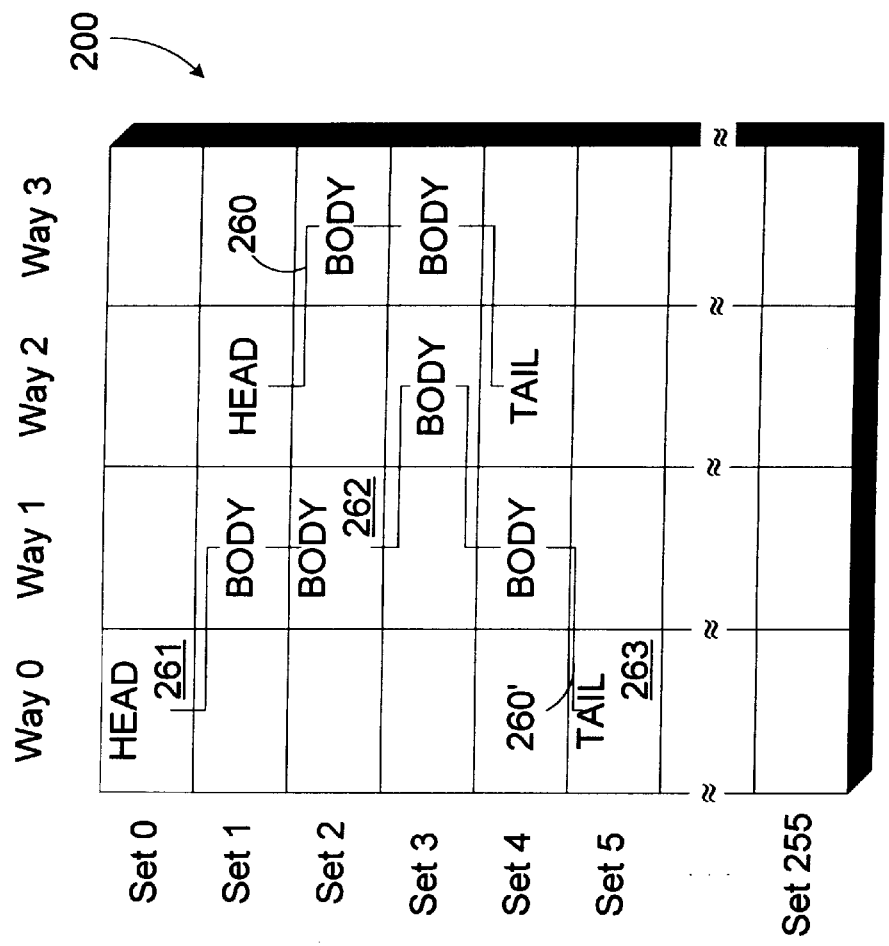
FIG. 3 is a block diagram illustrating the manner in which cached instructions are organized in the cache data array in accordance with the present invention.

FIG. 3 illustrates two trace segments 260 and 260' of the present invention in further detail. In the illustrated embodiment, the data array 200 is a 4-way, 256-set embodiment. Based on the descriptions to follow, those skilled in the art will appreciate that other sizes of set associative cache, as well as other non-set associative organizations may be employed to practice the present invention. For ease of illustration, the first trace segment member of a trace segment (e.g., trace segment 260') is referred to as a trace segment head 261. The intermediate trace segment members are referred to as trace segment bodies 262, and the last trace segment member of a trace segment 260' is referred to as a trace segment tail 263. In the degenerate case of a two-member trace segment, the second trace segment member is a trace segment body 262 as well as a trace segment tail 263, and in the degenerate case of a single member trace segment, the singular trace segment member is a trace segment head 261, a trace segment body 262, as well as a trace segment tail 263. Micro-ops of each trace segment are accessed by way of the memory address of the first micro-op of the trace segment head 261 as defined by information contained within the tag array 220.

For the illustrated embodiment, a location address is maintained for each data line storing the first trace segment member of a trace segment. The data line storing the first trace segment member of a trace segment is located by address matching an access address against the location addresses maintained. Furthermore, the address matching is performed using a subset of the address bits, and a matching data line is validated as to whether the data line indeed contains the first trace segment member being sought. Additionally, storing of trace segment members is further qualified with a criteria of ensuring the address matching subset of the location addresses maintained in association with the various ways of a data line set, if any, is unique.

In an alternate embodiment, other trace segment members are also associated with memory addresses. In yet another alternate embodiment, address matching is performed using all address bits.

For the illustrated embodiment, partial control information sequentially associating each data line storing a trace segment body or tail with its predecessor data line in a logical manner is maintained. Similarly, partial control information sequentially associating each data line storing a trace segment head or body with its successor data line in a logical manner is also maintained. The successive data lines of a multi-line trace segment are located, relying in part on the partial sequential association control information maintained. More specifically, for each data line storing a trace segment body or tail, a way index indexing into a way of the set of the predecessor data line is maintained, and for each data line storing a trace segment head or body, a way index indexing into a way of the set of the successor data line is maintained. Additionally, a predetermined set relationship between the successive data lines of a multi-line segment is maintained.

For the illustrated embodiment, a number of data line terminating conditions are employed to terminate caching of micro-ops of the trace segment 260 in one data line, and continue caching of the micro-ops of the trace segment 260 in another data line. Furthermore, a number of trace segment terminating conditions are also employed to terminate caching of micro-ops as one trace segment 260, and continue caching of instructions as a new trace segment (e.g., 260').

For the illustrated embodiment, the data line terminating conditions include the encountering of a complex macro-instruction that decodes into a large number of micro-ops. Only a predetermined number of micro-ops of the encountered complex macro-instruction are stored in the current data line, and the micro-ops of the next macro-instruction will be cached in a new data line. The determination of what constitutes a complex macro-instruction is application specific. It will be appreciated by those skilled in the art that the present invention may be practiced with none or all of the decoded micro-ops of a complex macro-instruction being cached.

For the illustrated embodiment, the data line terminating conditions further include the encountering of a branch micro-op after a predetermined threshold of maximum allowable branch micro-ops per trace segment has been reached. The branch micro-op will be cached in a new data line. In one embodiment, the predetermined threshold is two. However, it will be appreciated by those skilled in the art that the present invention may be practiced with or without a predetermined threshold for maximum allowable branch micro-ops per trace segment, and if one is employed, the threshold may be less than or greater than two.

For the illustrated embodiment, the data line terminating conditions further include the condition of not having enough room for all the micro-ops of a new macro-instruction. The micro-ops of the new macro-instruction will be cached in a new data line. In other words, for the illustrated embodiment, all micro-ops of a macro-instruction are cached in the same data line. However, it will be appreciated by those skilled in the art that the present invention may be practiced with micro-ops of a macro-instruction cached in more than one data line.

For the illustrated embodiment, the data line terminating conditions further include the condition of the fill buffers 250 being fill. However, it will be appreciated by those skilled in the art that the present invention may be practiced with a data line taking multiple fills from a fill buffer.

For the illustrated embodiment, the trace segment terminating conditions include the encountering of an indirect branch macro-instruction, a call, or a return. However, it will be appreciated by those skilled in the art that with additional tracking, the present invention may be practiced with each trace segment 260 having more than one indirect branch macro-instruction, call, and/or return.

For the illustrated embodiment, the trace segment terminating conditions further include the encountering of a branch misprediction notification, as well as an interrupt/exception.

For the illustrated embodiment, the trace segment terminating conditions further include the encountering of a long running trace segment 260 having a number of micro-ops that exceeds a predetermined maximum allowable trace segment length in terms of number of micro-ops per trace segment. In one embodiment, the predetermined maximum is 64 sets. However it will be appreciated by those skill in the art that the present invention may be practiced with or without a predetermined maximum, and if one is employed, the maximum value may be lesser than or greater than 64 sets.

FIG. 4 illustrates in further detail one embodiment of a tag entry 400 in the tag array 220 in accordance with the present invention. For the illustrated embodiment, the tag entry 400 includes a head bit 405 and a tail bit 410 for denoting whether the corresponding data line is a trace segment head 261 and/or a trace segment tail 263. If neither bit is set, the corresponding data line is a trace segment body 262. If both bits are set, the corresponding data line is also a trace segment body 262, as well as the trace segment head 261 and tail 263, i.e., the singular-member degenerate case described earlier. For the illustrated embodiment, the tag entry 400 further includes linear address bits (LA) 415 for storing a linear address in the event that the corresponding data line is a trace segment head, and a valid bit 420 for denoting whether the linear address bits 415 are valid.

For the illustrated embodiment, the tag entry 400 further comprises next way bits 425 and previous way bits 430 for facilitating sequential retrieval of the immediate successor trace segment member. More specifically, the next way bits 425 and previous way bits 430 specify the way location of the successor and predecessor data lines. For the illustrated embodiment, the tag entry 400 does not include any bits for denoting the set identifications for the successor and predecessor data lines. For the illustrated embodiment, the set identification of the successor and predecessor data lines are always X+1 modulo S and X−1 modulo S, respectively, where X is the set identification of the current data line, and S is number of sets of the data array 200. In an alternate embodiment, additional bits may be employed to specify the set identifications of the successor and predecessor data lines. In other words, the successor and predecessor data lines may be located in any set.

For the illustrated embodiment, the tag entry 400 further comprises next micro-op IP bits (uIP) 435 for identifying the next micro-op IP, next macro-instruction linear IP bits (NLIP) 440 for identifying the next macro-instruction linear IP, and a uIP valid bit 445 for indicating whether the uIP 435 is valid. The uIP 435 is also used as an entry pointer into the microcode sequencer 115 for micro-ops of an encountered complex macro-instruction. The uIP valid bit 445, when set, indicates that instruction caching a within the current data line was terminated in response to the encountering of a complex macro instruction. In one embodiment, the NLIP 440 is maintained for a trace segment tail only. In an alternate embodiment, the NLIP 440 is maintained for a trace segment head, a trace segment body, as well as a trace segment tail. Maintaining an NLIP 440 with each trace segment member has the advantage of not having to calculate it in real time, in the event it is needed while accessing the trace segment members, e.g., when the remaining trace segment member is replaced, as explained in more detail below.

Each tag entry 400 is constructed when the corresponding data line is built. More specifically, for the cache memory 105 illustrated in FIG. 1, each tag entry 400 is constructed in the fill buffers 250, while the corresponding data line is constructed. The manner in which each tag entry 400 is constructed, and the usage of these fields are described below.

FIGS. 5 and 6 illustrate in further detail one embodiment of a data line in the data array 200. As shown, for the illustrated embodiment, each data line 500 comprises six micro-ops (uOPs) 510. As shown in FIG. 6, each uOP 510 comprises a valid bit 610 denoting whether the uOP 510 is valid, source register bits 620, 630, destination register bits 640, and uOP code bits 650. For the illustrated embodiment, each uOP 510 further comprises delta IP bits 660 denoting the delta increment for the macro-instruction IP, delta IP valid bit 670 denoting whether the delta IP bits 660 are valid, branch target bits 680 specifying a branch target address if the uOP 510 is a branch micro-op, and FOP Code bits 690 denoting a floating point opcode if the uOP 510 is a floating point operation. For the illustrated embodiment, the information stored with each uOP 510 may be provided by the decoder 140.

It should be noted that some of the information described as being stored in tag entry 400 may be stored in the corresponding data line 500, and vice versa. It should also be noted that the specific number of bit(s) used for each field can be selected according to various design considerations, and that the numbers specified herein are for ease of understanding of the present invention.

Referring now back to FIG. 2, as described earlier, for the illustrated embodiment, the cache memory 105 includes fill buffers 250. The linear address 415 of a trace segment head (stored in the corresponding tag entry 400) is routed to branch address calculation circuitry of the TBPU 110. Besides the LA 415, the NLIP 440 is routed to the next IP calculation circuitry of the TBPU 110 for calculating the next IP, whose input includes the output of the branch address calculation circuitry. The micro-op IP (uIP) 435 is routed to the microcode sequencer 115 for fetching the remaining uOPs of a complex macro-instruction, and to the multiplexer 120 for selecting between the uOPs output by the data array 200 and the microcode sequencer 115, respectively.

The fill buffers 250 are used to build up the data lines along the predicted execution direction before they are transferred to the tag array 220 and the data array 200, as the data width of the datapath from an external memory (not shown) to the decoder 140, and therefore from the decoder 140 to the fill buffers 250, is smaller than the size of a data line. For the illustrated embodiment, the fill buffers 250 include multiple buffers to facilitate multiple data lines to be constructed at the same time. The fill buffers 250 collect the address and control information as well as the decoded uOPs that are stored into the tag entries 400 of the tag array 220 and corresponding data lines of the data array 200.

The control logic 210, in addition to controlling the tag array 220 and the data array 200, also controls the operation of the fill buffers 250.

At some point in time the cache memory 105 will need to replace an existing data line to store a new trace segment, thereby replacing a trace segment member of an existing trace segment Candidates for replacement may be chosen by way prediction, least recently used (LRU), and the like. Replacing the line will cause the trace segment containing the original line to be disrupted. Any trace segment members included in cache lines following the replaced line would be cut off from the existing trace segment. To facilitate later retrieval, the replaced trace segment member is stored in the TVC 230.

Figure 9:
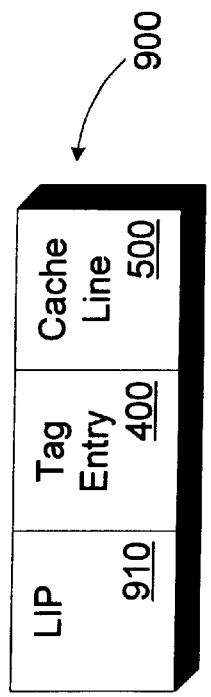
FIG. 9 illustrates the content of a trace victim cache entry.
Figure 7:
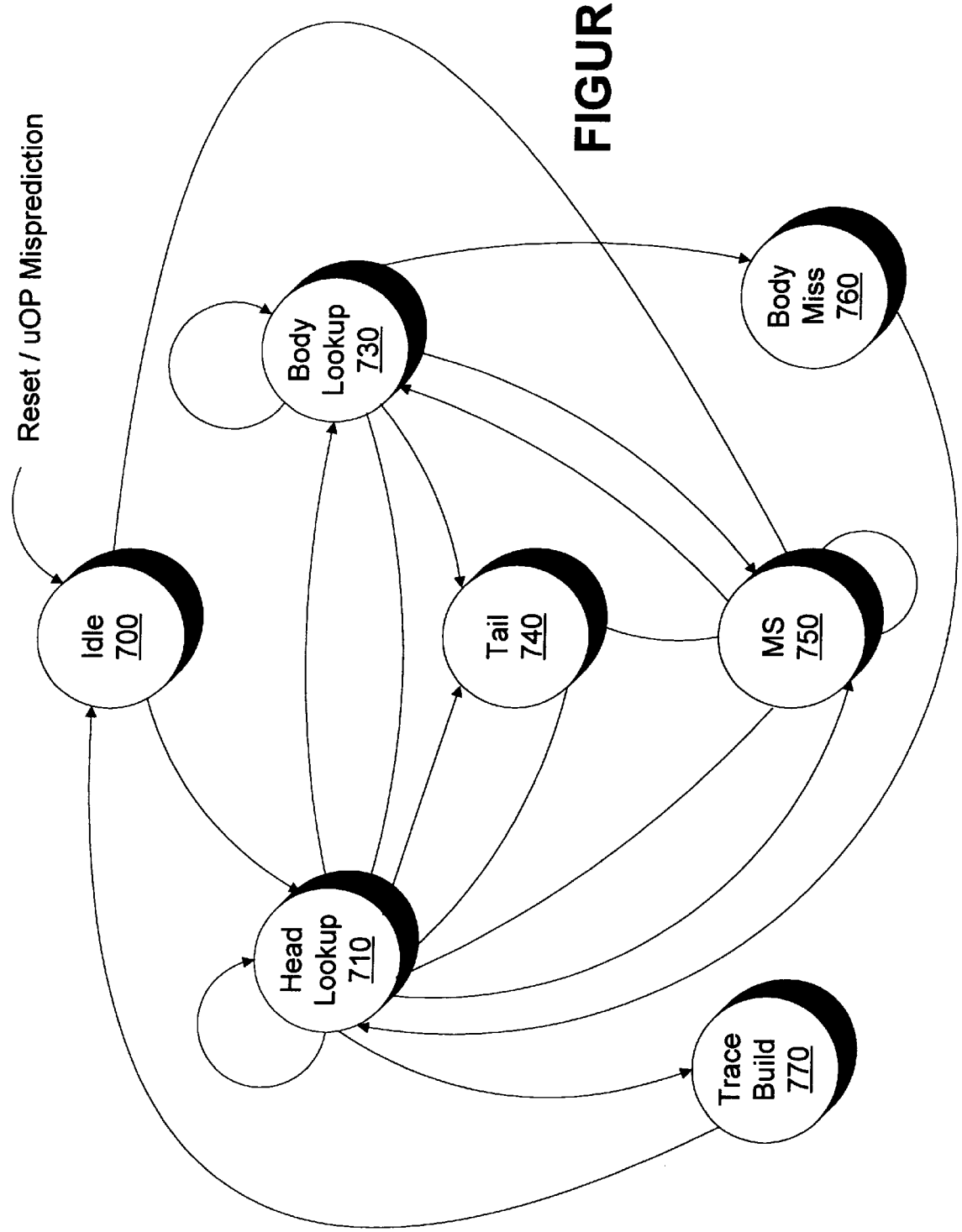
FIG. 7 is a state diagram illustrating the manner in which control logic operates the cache memory of FIG. 2 in an execution mode.
Figure 8:
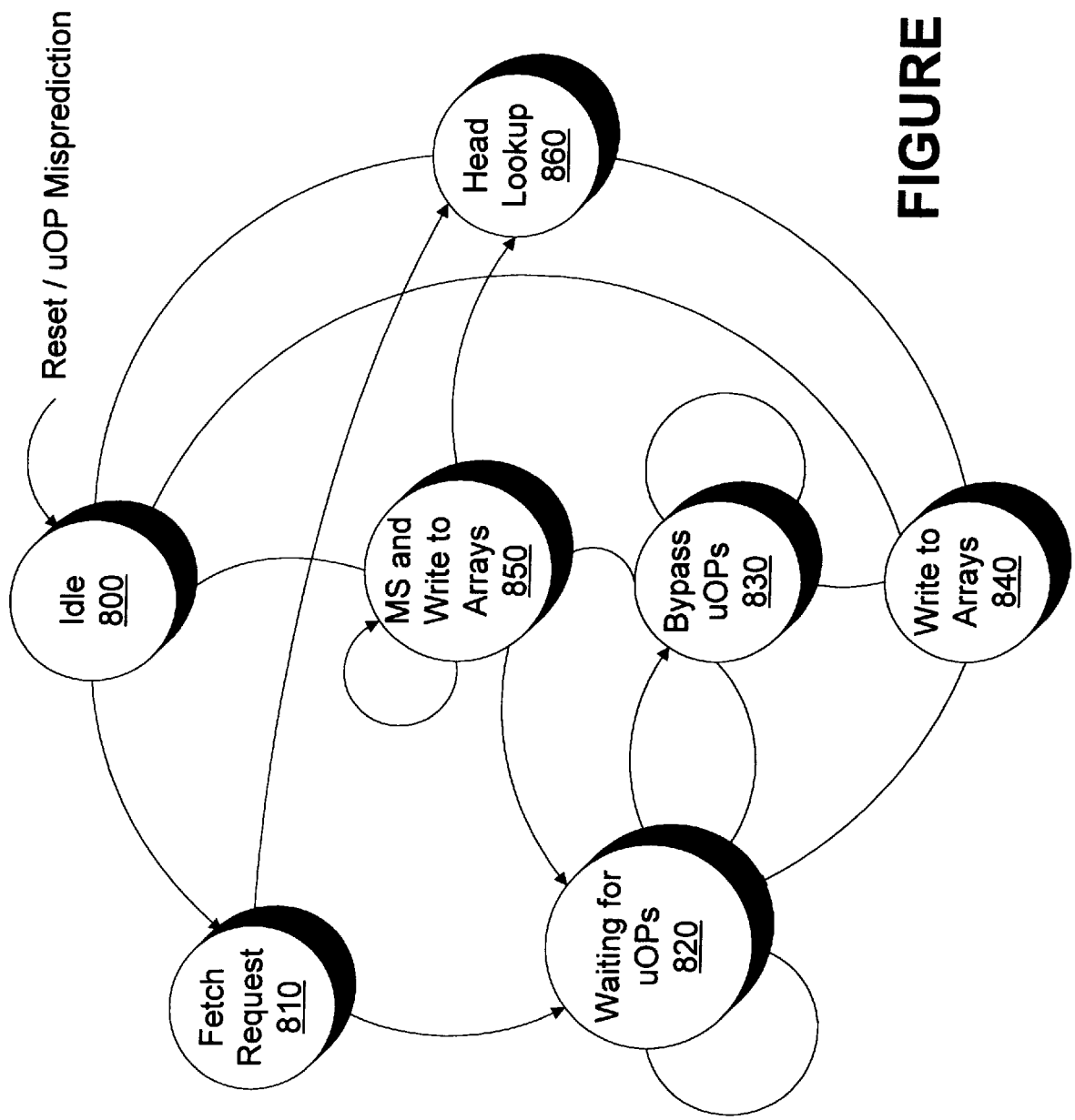
FIG. 8 is a state diagram illustrating the manner in which control logic operates the cache memory of FIG. 2 in a trace segment build mode.

As illustrated in FIG. 9, a TVC entry 900 in the TVC 230 includes information from the tag array entry 400 and the cache line 500 of the replaced trace segment member and the linear instruction pointer (LIP) 910 of the first instruction of the replaced trace segment member. The LIP 910 may be determined from the NLIP bits 440 of the trace segment member preceding the replaced line. Alternatively, the LIP of the first instruction in each trace segment member may be stored in the tag entry 400 when the trace segment 260 is built. This facilitates quicker lookups as compared to querying the previous line for the NLIP 440. The use of trace segment members stored in the TVC 230 is described in greater detail below. The control logic 210 comprises a plurality of state machines. FIGS. 7 and 8 illustrate the manner in which the control logic 210 operates the embodiment of the cache memory 105 illustrated in FIG. 2. The control logic 210 operates the cache memory 105 basically in one of two complementary modes, an execution mode, which is illustrated in FIG. 7, and a trace segment building mode, which is illustrated in FIG. 8. In one embodiment, the two complementary modes operate exclusive of one another, whereas in another embodiment, with the provision of arbitration circuitry for sharing resources, the two complementary modes may operate concurrently. In one embodiment, the two complementary modes are controlled by two corresponding state machines. It is contemplated that the present invention may be practiced with more or less state machines.

The execution mode state machine shown in FIG. 7 operates in one of seven states, an idle state 700, a head lookup state 710, a body lookup state 730, a tail state 740, a micro-sequencer (MS) state 750, a body miss state 760, and a trace build state 770. As shown, the execution mode state machine starts off in the idle state 700, upon reset or upon detection by the execution units 125 of a uOP branch misprediction condition. The execution mode state machine transitions from the idle state 700 to the head lookup state 710 when the control logic 210 is informed by the execution units 125 of a macro branch misprediction condition, or it detects either a fetch from a linear address or end of trace segment build condition.

While in the head lookup state 710, the execution mode state machine causes a trace segment head to be looked up by address matching a next IP, provided by the next IP calculation circuitry of the TBPU 110, against the memory addresses maintained for the trace segment heads. The execution mode state machine will cause the trace segment lookup process to be restarted with a new next IP, if a macro branch misprediction condition is detected by the execution units 125 prior to the completion of the current lookup. If the head lookup process proceeds to the end, the process will result in either a cache hit or cache miss.

If the head lookup process results in a cache hit, and the trace segment head is not also a trace segment tail, and the trace segment head data line did not end with a complex macro-instruction, the execution mode state machine causes the micro-ops of the trace segment head to be output to the execution units 125 and transitions to the body lookup state 730. If the head lookup process results in a cache hit, and the trace segment head is also a trace segment tail, and the trace segment head data line did not end with a complex macro-instruction, the execution mode state machine causes the micro-ops of the trace segment head to be output to the execution units 125 and transitions to the tail state 740. If the head lookup process results in a cache hit, and the trace segment head data line ends with a complex macro-instruction, the execution mode state machine causes the micro-ops of the trace segment head to be output to the execution units 125 and transitions to the MS state 750. In any case, if the head lookup process results in a cache hit, the set register 235 is loaded with the set number of the trace segment head 261.

If the head lookup process results in a cache miss, the execution mode state machine queries the TVC 230 with the NLIP 440 to determine if a corresponding TVC entry 900 is present by matching the LIP 910 of the TVC entry 900. If a match is found, the head LA 415 of the TVC entry 415 is compared to the LIP 910 to verify that the TVC entry 900 is indeed the proper head segment, and a hit is generated if they match. In the case of a TVC 230 hit, the uOPs are supplied to the execution units 125. The set register 235 is loaded with the set number that had been used to store the trace segment head 261 and incremented (X+1 modulo S). The set number is determined from the least significant bits of the head LA 415, which are used for translating the LA 415 to the set number in the data array 200 when a trace segment is first built. The execution mode state machine then transitions to the body lookup state, using the information in the set register 235 and the TVC entry 900 to locate the next trace segment body 262. Upon a TVC 230 miss, the execution mode state machine transitions to the trace build state 770.

While in the body look up state 730, the execution mode state machine causes the next trace segment body to be looked up. For the illustrated embodiment, as described earlier, the next trace segment body is located in the data line of set X+1 modulo S in way W indexed by next way bits 425 of the current tag entry 400, where X is the current set, S is the number of sets of the data array 200, and W is the indexed way. In an alternate embodiment, the next trace segment body is located in the data line of set Y (denoted by a set identifier bit) in way W indexed by next way bits 425 of the current tag entry 400. Once located, the execution mode state machine causes the uOPs of the trace segment body to be output to the execution units 125. The execution mode state machine remains in the body lookup state 730 and continues to cause the next trace segment bodies to be looked up, and their uOPs to be output, upon locating them, as long as it is getting cache hits, and has not reached the trace segment tail, nor encountered a data line ending with a complex macro-instruction, nor has been informed of a macro/micro branch misprediction condition by one of the execution units 125. For the illustrated embodiment, decoded micro-ops of a macro-instruction may include one or more branch micro-ops.

While in the body lookup state 730, if the control logic 210 is informed of the detection of a macro branch misprediction by one of the execution units 125, the execution mode state machine aborts the body lookup process, and transitions back to the head lookup state 710. If the body lookup process results in a cache hit, and the data line does not end with a complex macro-instruction, but the data line is a trace segment tail, the execution mode state machine transitions to the tail state 740 after the uOPs of the trace segment tail have been output. If the body lookup process results in a cache hit, and the data line ends with a complex macro-instruction, the execution mode state machine transitions to the MS state 750 after outputting the uOPs of the cache line. The set register 235 is incremented (X+1 modulo S) as each successive body segment is located. Alternatively, if the next trace segment body is located in the cache line of set Y (denoted by a set identifier bit) in way W indexed by next way bits 425 of the current tag entry 400, the set register will be loaded with the value of set Y. In either case, the value in the set register corresponds to the set number of the current trace segment member. If the body lookup process results in a cache miss, the execution mode state machine transitions to the body miss state 760.

At the tail state 740, the execution mode state machine unconditionally returns to the head lookup state 710.

At the body miss state 760, the execution mode state machine queries the TVC 230 with the NLIP 440 to determine if a corresponding TVC entry 900 is present by matching the LIP 910 of the TVC entry 900. If a match is found, the head LA 415 from the previous trace segment member is checked against the head LA 415 of the TVC entry 900, and a hit is generated if they match. In the case of a TVC 230 hit, the uOPs are supplied to the execution units 125. The set register 235 is incremented (X+1 modulo S) and the TVC 230 is again queried to determine if the next NLIP 440 matches the LIP 910 of an TVC entry 900. This process continues until a TVC 230 miss occurs.

On a TVC 230 miss, the value in the set register 235 is incremented (X+1 modulo S). The incremented value stored in the set register 235 and the next way 425 information stored in the last executed TVC entry 900 are used to synchronize back to the tag array 220. A lookup in the tag array 220 is conducted by matching the LA bits 415 of the last segment member executed from the TVC 230 to the LA bits 415 of the tag array entry 400 addressed by the incremented value in the set register 235. If a match occurs execution continues from the tag array 220 as described above. If a match does not occur, the cache memory 105 transitions to the head lookup state 710. In some embodiments, the information stored in the TVC 230 may be copied back into the tag and data arrays 220, 200 before, after, or concurrent with the uOPs being provided to the execution units 125. In other embodiments, the information stored in the TVC 230 may not be copied back into the tag and data arrays 220, 200.

The TBPU 110 may include a trace branch target buffer (TBTB) 112 for tracking branch history and facilitating branch prediction for a particular trace segment member. Typically, the TBTB 112 stores branch information based on the set number of the trace segment member. Because the value in the set register 235 corresponds to the set number of the current trace segment member, this value may be used to access the TBTB 112 for trace segment members executed from the TVC 230.

At the MS state 750, the execution mode state machine allows the microcode sequencer 115 to output the remaining uOPs of the data line ending with a complex macro-instruction. The execution mode state machine allows the microcode sequencer 115 to continue until all remaining uOPs have been output, as long as it is not informed of the detection of a macro/micro branch misprediction condition by the execution units 125. The execution mode state machine aborts the allowance if it is informed of the detection of a macro/micro branch misprediction condition by the execution units 125. The execution mode state machine transitions back to the head lookup state 710 if it is informed of the detection of a macro branch misprediction condition. The execution mode state machine transitions back to the idle state 700 if it is informed of the detection of a micro branch misprediction condition.

However, if the control logic 210 is informed by the microcode sequencer 115 that it has finished outputting the remaining uOPs of the data line ending with a complex macro-instruction, the execution mode state machine transitions to the body lookup state 730 if the data line is not a trace segment tail, and to the tail state 740 if the data line is a trace segment tail.

At the trace build state 770, the execution mode state machine unconditionally transitions to the idle state 700 on detection of a trace segment ending condition (denoted by the complementary trace segment build mode state machine) In other words, the trace build state 770 of the execution mode is essentially a wait state.

The trace segment build mode state machine shown in FIG. 8 operates in one of seven states, an idle state 800, a fetch request state 810, a waiting for uOPs state 820, a bypassing uOPs state 830, a write to arrays state 840, a microcode sequencer (MS) and write to arrays state 850, and a head lookup state 860. As shown, the trace segment build mode state machine starts off in the idle state 800, upon reset or upon detection by the execution units 125 of a macro-micro branch misprediction condition. The trace segment build mode state machine transitions from the idle state 800 to the fetch request state 810 when the control logic 210 detects a need to issue an instruction fetch request, ie., an access to the cache memory 105 results in a tag array 220.

At the fetch request state 810, the trace segment build mode state machine causes an instruction fetch request to be issued to the ITLB 135, and transitions to the waiting for uOPs state 820. The trace segment build mode state machine remains in the waiting for uOPs state 820 until valid uOPs are provided to the fill buffers 250. At such time, the trace segment build mode state machine transitions to the bypass uOPs state 830. At the bypass uOPs state 830, the trace segment build mode state machine bypasses the valid uOPs to the execution units 125 as it writes into the fill buffers 250 until a data line terminating condition is encountered. If the data line terminating condition is the encountering of a complex macro-instruction, the trace segment build mode state machine transitions to the MS and write to arrays state 850. For other data line terminating conditions, if the bypassed uOPs built up in the fill buffers 250 are not cacheable, the trace segment build mode state machine returns to the waiting for uOPs state 820. Otherwise, the trace segment build mode state machine transitions to the write to arrays state 840.

At the write to arrays state 840, the completed data line is transferred into corresponding locations in the tag and data arrays 220 and 200. Recall that for the illustrated embodiment, the locations in data array 200 are the locations of one of the ways of set X+1 modulo S. Recall that for an alternate embodiment, the locations in data array 200 are the locations of one of the ways of an indexed set. In one embodiment, the way is selected by way prediction. Alternatively, an LRU approach may be used. Furthermore, when used in conjunction with the partial address matching approach for looking up a trace segment head, the LRU approach may be further qualified with the assurance that the tag matching subsets of the tag addresses for set X+1 module S (or an indexed set) will be unique. In other words, if a non-LRU way has a corresponding tag matching subset of its tag address that is the same as the tag matching subset of the tag address of the incoming data line, that non-LRU way is selected instead of the LRU way.

If a valid trace segment member is replaced, the replaced trace segment member is allocated into the TVC 230 as described above. The TVC 230 may employ a replacement method such as LRU if all entries in the TVC 230 have been previously allocated. Upon writing the data line into the tag and data arrays 220 and 200, the trace segment build mode state machine transitions back to the waiting for uOPs state 820 if the data line that was just written into the data array 200 is not a trace segment tail. If the written data line is a trace segment tail, the trace segment build mode state machine transitions back to the idle state 800 if the NLIP is not known, otherwise, the trace segment build mode state machine transitions to the head lookup state 860.

At the MS and write to arrays state 850, the completed data line is written into the tag and data arrays 220 and 200, as described earlier for the write to arrays state 840. However, the trace segment build mode state machine does not transition out of the MS and write to arrays state 850 until it has been signaled by the microcode sequencer 115 that the remaining micro-ops of the complex macro-instruction have all been output to the execution units 125. Upon completion of output by the microcode sequencer 115, as in the write to arrays state 840, the trace segment build mode state machine transitions to the waiting for uOPs state 820 if the written data line was not a trace segment tail. If the written data line is a trace segment tail, the trace segment build mode state machine transitions to the idle state 800 if the NLIP is unknown, and to the head lookup state 860 if the NLIP is known. Additionally, the trace segment build mode state machine will transition to the idle state 800 if the control logic 210 receives notification that a micro branch misprediction has been detected by the execution units 125.

At the head lookup state 860, the trace segment build mode state machine causes the trace segment head to be looked up based on the known NLIP (through the complementary execution mode state machine). The trace segment build mode state machine transitions to the idle state 800 if the lookup resulted in a hit (as informed by the complementary execution mode state machine). Otherwise, the trace segment build mode state machine transitions to the fetch request state 810. From the fetch request state 810, the cache memory 105 transitions to the other states as described earlier.

Thus, advantages of storing replaced trace segment members in the TVC 230 have been illustrated. By executing lines out of the TVC 230, costly switches to build mode can be avoided and code redundancy can be reduced. Therefore, cache hit rate, and resultingly, processor performance are enhanced.

While the invention is susceptible to various modifications and alternative forms, specific embodiments have been shown by way of example in the drawings and have been described in detail herein. However, it should be understood that the invention is not intended to be limited to the particular forms disclosed. It will be appreciated by those of ordinary skill having the benefit of this disclosure that numerous variations from the foregoing illustrations will be possible without departing from the inventive concept described herein. Accordingly, it is the claims set forth below, and not merely the foregoing illustration, which are intended to define the exclusive rights claimed in this application.

What is claimed is:

1. A cache memory, comprising:
    a data array to store a plurality of trace segment members which are linked to form a trace segment; and
    a trace victim cache coupled to store a trace segment member replaced from the data array, the replaced trace segment member having an entry associated with maintaining a link to a previous trace segment member of the trace segment to re-establish the trace segment when the replaced trace segment member is retrieved, the replaced trace segment member also having a link to a subsequent trace segment member, if present, to continue the trace segment.

2. The cache memory of claim 1, wherein said data array operates as a primary cache memory and said data array is configured to have a plurality of sets and one trace segment member is stored per set.

3. The cache memory of claim 1, further comprising a tag array having a plurality or tag entries, in which the tag entries correspond to identify the trace segment members.

4. The cache memory of claim 3, wherein each trace segment member includes at least one instruction and the cache memory further comprising a control logic coupled to retrieve the instruction or instructions from the trace segment member.

5. The cache memory of claim 4, wherein the control logic retrieves the instruction or instructions from the replaced trace segment member, determines an expected location of the subsequent trace segment member within the data array based on its tag entry and provide the link to the subsequent trace segment member.

6. The cache memory of claim 5, wherein said data array is organized into N ways of S sets and wherein the tag entry includes a next way field indicating the way in which the subsequent trace segment member is stored.

7. The cache memory of claim 5, wherein the control logic determines if the subsequent trace segment member to be linked is present in said data array.

8. The cache memory of claim 7, wherein the control logic stores the replaced trace segment member from the trace victim cache in the data array and the tag entry from the trace victim cache in the tag array.

9. The cache memory of claim 7, wherein the tag data of the replaced trace segment member includes a next instruction pointer which is compared to a linear instruction pointer.

10. The cache memory of claim 2, further comprising a control logic coupled to retrieve the replaced trace segment member from said trace victim cache and to link to the subsequent trace segment member of the trace segment.

11. The cache memory or claim 10, further comprising a set register coupled to said data array to store a set value corresponding to a set in the data array, wherein the set value corresponds to the set of a trace segment member currently in use.

12. The cache memory of claim 10, further comprising a set register coupled to said data array to store a set value corresponding to a set in the data array, wherein the set value corresponds to the set in the data array corresponding to the replaced trace segment member before being replaced.

13. A cache memory, comprising:
a data array to store a plurality of trace segment members which are linked to form a trace segment; and
means for storing a trace segment member victimized from said data array, the victimized trace segment member having an entry associated with maintaining a link to a previous trace segment member of the trace segment to re-establish the trace segment when the victimized trace segment member is retrieved, the victimized trace segment member also having a link to a subsequent trace segment member to continue the trace segment.

14. An apparatus comprising:
a data array to store a plurality of data elements which are segment members linked together to form a trace segment, wherein each data element includes an entry to link to an adjacent element in the trace segment; and
a victim cache to store an element of the segment which is victimized in said data array, the entry for the victimized element allowing the victimized element to link to its previous element still in said data array to re-establish the trace segment when the victimized element is retrieved, the victimized element also having a link to a subsequent element to continue the trace segment.

15. The apparatus of claim 14, wherein said data array operates as a primary cache memory and said data array is configured to have a plurality of sets and one data element is stored per set.

16. The apparatus of claim 14, further comprising a tag array to store tag information associated with each element.

17. A method for caching comprising:
storing a segment member of a trace segment, comprised of a plurality of linked segment members, in a location of a victim cache when the segment member is victimized in a data array storing the trace segment;
retrieving the victimized trace segment member when retrieving the trace segment;
identifying a link entry in the victimized segment member to link to a previous segment member of the trace segment still in the data array and also to a subsequent segment member of the trace segment; and
determining if the subsequent segment member is stored in the data array at its expected location.

18. The method of claim 17 further comprising:
determining if the subsequent segment member is stored in the victim cache, if the subsequent segment member is not stored in the data array.

19. The method of claim 18 further comprising:
retrieving the subsequent segment member from the victim cache.

20. The method of claim 17 further comprising:
retrieving the subsequent segment member from the data array.

21. The method of claim 18 further comprising:
storing a set value in a set register, the set value corresponding to the location of the victimized segment member.

22. The method of claim 21 further comprising:
retrieving the subsequent segment member; and
incrementing the set value corresponding to the retrieval of the subsequent segment member.

23. The method of claim 21 further comprising:
retrieving the subsequent segment member from the victim cache; and
incrementing the set value corresponding to the retrieval of the subsequent segment member.

24. The method of claim 21 further comprising:
retrieving the subsequent segment member from the data array, the set value corresponding to a location of the subsequent segment member within the data array.

25. The method of claim 22 further comprising:
retrieving branch prediction information from a branch prediction unit corresponding to the set value to determine correct branching for the trace segment.

26. The method of claim 24 further comprising:
retrieving branch prediction information from a branch prediction unit corresponding to the set value to determine correct branching for the trace segment.

27. A method of caching instructions, comprising:
storing a trace segment of instructions in a data array, the trace segment having a plurality of segment members which are linked to form the trace segment;
victimizing one of the segment members of the trace segment;
storing the victimized segment member in a trace victim cache;
retrieving the victimized segment member when retrieving the trace segment by a link to a previous segment member to the victimized segment member; and
linking a subsequent segment member of the trace segment still residing in the data array to the victimized segment member by using a link entry associated with the subsequent segment member re-establishing the trace segment without reloading the subsequent trace segment still residing in the data array.

28. A microprocessor system, comprising:
a data array to store a plurality of segment members which are linked to form a trace segment;
a trace victim cache to store a segment member which is victimized in said data array, the victimized segment member having a link to a previous segment member and a link to a subsequent segment member; and
a control logic to retrieve the victimized segment member and to identify its subsequent segment member in the trace segment to re-establish the link without reloading the subsequent segment member into the data array.

* * * * *

UNITED STATES PATENT AND TRADEMARK OFFICE
CERTIFICATE OF CORRECTION

PATENT NO. : 6,216,206 B1  Page 1 of 1
DATED : April 10, 2001
INVENTOR(S) : Peled et al.

It is certified that error appears in the above-identified patent and that said Letters Patent is hereby corrected as shown below:

Column 1,
Line 23, delete "fill" insert -- full --.

Column 5,
Line 39, delete "fill" insert -- full --.

Signed and Sealed this

Seventh Day of May, 2002

Attest:

Attesting Officer

JAMES E. ROGAN
Director of the United States Patent and Trademark Office